June 24, 1924.
G. F. SCHOLLE
1,498,697
POULTRY FEED HOPPER AND TROUGH
Original Filed Sept. 10, 1923
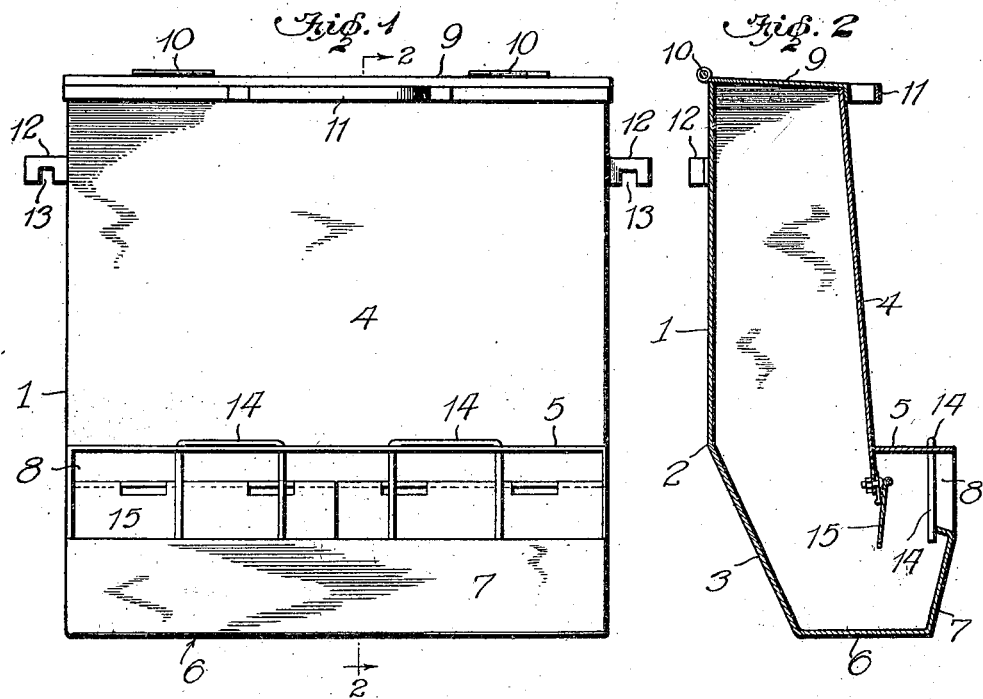
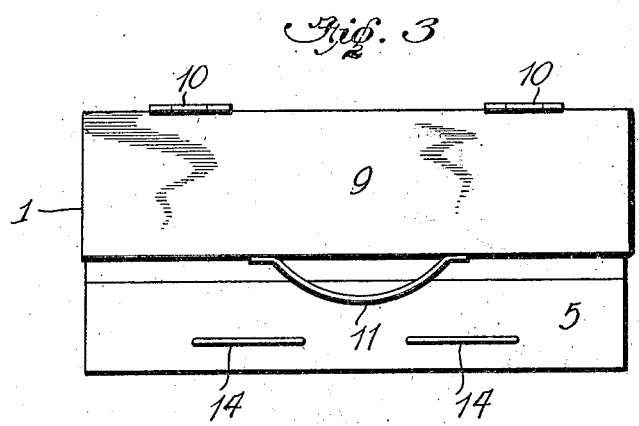
Inventor
Gustav F. Scholle
By E. K. Bond
Attorney Patented June 24, 1924.

1,498,697

UNITED STATES PATENT OFFICE.

GUSTAV F. SCHOLLE, OF CONCORDIA, MISSOURI.

POULTRY FEED HOPPER AND TROUGH.

Original application filed September 10, 1923, Serial No. 661,875. Divided and this application filed September 28, 1923. Serial No. 665,343.

*To all whom it may concern:*

Be it known that I, GUSTAV F. SCHOLLE, a citizen of the United States, residing at Concordia, in the county of Lafayette and State of Missouri, have invented certain new and useful Improvements in Poultry Feed Hoppers and Troughs, of which the following is a specification.

This invention relates to certain new and useful improvements in feed hoppers and troughs of that general class designed for use as poultry feeders, and the present invention has for its objects to provide a simple and cheap, yet efficient hopper, designed for a dry mash poultry feeder, so constructed that the feed cannot become choked or clogged. The back of the hopper is substantially straight and vertical for a major portion of its height and then slants down and forwardly. The front wall is somewhat inclined forwardly from the top to the top of the trough at the front of the device. By this means the feed is caused to run down and forward into the feed trough positioned beneath and extending forwardly from the bottom of the hopper. The walls of the feeder are so built that friction on the walls will not stop the flow of the feed into the feed trough, the feed flowing by gravity and continuing to run till the last bit has been eaten.

Other objects and advantages of the invention will hereinafter appear and the novel features thereof will be specifically defined by the appended claim.

The invention is clearly illustrated in the accompanying drawings, which, with the numerals of reference marked thereon, form a part of this specification, and in which—

Figure 1 is a front elevation of a poultry feeder embodying my present invention.

Figure 2 is a vertical section from front to rear, as on the line 2—2 of Figure 1, looking in the direction of the arrows.

Figure 3 is a top plan.

Like numerals of reference indicate like parts throughout the several views.

Referring to the drawings—

1 designates the rear wall of the hopper, which, it will be noticed, is practically vertical and straight without bend or angle, or even any curvature. It extends from the top to the point 2, which is practically the top of the rear portion of the trough, where it joins the downwardly and forwardly inclined wall 3 which is the rear wall of the trough.

The front wall 4 of the hopper is inclined downwardly to or slightly below the top 5 of the hopper-trough, as seen best in Figure 2. 6 is the bottom of the trough and 7 is the front wall of the trough, the latter being shown as inclined downwardly and inwardly, see Figure 2.

The front wall of the trough, above this inclined portion is open as seen at 8 for the poultry to put in their heads to get the feed.

The hopper is shown as provided with a cover or top 9, in the present instance shown as hinged by suitable hinges 10 to the upper end of the rear wall of the hopper, but it may be otherwise connected, or may be a removable cover. It is shown as provided at its forward edge with a handle 11 by which it may be manipulated.

12 are lugs or the like on opposite ends of the hopper, provided with notches 13, permitting the hopper to be supported over hooks or other means when desired. These lugs however may be omitted as shown by Figure 3.

As seen clearly in Figure 2 the construction is such that the space between the front and rear walls is narrowest at the top and gradually widens as it approaches the bottom of the trough. By this means the feed cannot clog the hopper, and there being no curve between the top and bottom of the hopper there is nothing to prevent ready and steady flow of the feed.

Suitable means, as the wires 14, loosely pendent through openings in the top 5 of the trough, are shown; these are provided to prevent the poultry from wasting the feed. These wires normally hang substantially vertically as seen in Figure 2, but are readily pushed inward by the head of the poultry so they can readily peck at the food but cannot throw it about nor scatter it outside the trough, hence there is practically none of it wasted and there is no danger of the hen getting its neck caught in the wires.

A feed regulator 15 may also be provided as seen in Figure 2, which may be for instance of the general nature as that disclosed in my copending application Serial No. 661,875, filed September 10, 1923.

What is claimed as new is:—

A poultry feeder, comprising a hopper and trough, a substantially vertical wall forming the rear of the hopper, a front wall inclined downwardly and forwardly to a point below the bottom of the rear wall, a bottom wall, a forwardly and downwardly inclined rear wall of the trough joining the bottom of the rear wall of the hopper with the rear edge of the bottom wall, an upwardly and forwardly inclined front wall of the trough, having an opening, a top to the trough joining the front wall of the trough to the front wall of the hopper at a point above the lower end of the latter, and wires loosely pendent through openings in the top of the trough and extended vertically across the opening in the front wall of the trough.

In testimony whereof I affix my signature.

GUSTAV F. SCHOLLE.